United States Patent
Beauregard

(10) Patent No.: US 6,904,713 B2
(45) Date of Patent: Jun. 14, 2005

(54) SUPPORT FOR TRAP, COMBINATION THEREOF AND METHOD

(76) Inventor: Kurt D. Beauregard, 736 Saltspringville Rd., Fort Plain, NY (US) 13339

( * ) Notice: Subject to any disclaimer, the term of this patent is extended or adjusted under 35 U.S.C. 154(b) by 0 days.

(21) Appl. No.: 10/653,518

(22) Filed: Sep. 2, 2003

(65) Prior Publication Data

US 2004/0123511 A1 Jul. 1, 2004

Related U.S. Application Data

(60) Provisional application No. 60/419,284, filed on Oct. 18, 2002.

(51) Int. Cl.[7] ............................................. A01M 23/26
(52) U.S. Cl. ......................................................... 43/88
(58) Field of Search ................................ 43/88, 96, 89, 43/97; D22/119, 199

(56) References Cited

U.S. PATENT DOCUMENTS

| 833,827 | A | * | 10/1906 | Dawkins ........................ 43/88 |
|---|---|---|---|---|
| 1,409,924 | A | | 3/1922 | Byrne | |
| 2,333,828 | A | * | 11/1943 | Taylor ........................... 43/92 |
| 3,010,245 | A | | 11/1961 | Conibear | |
| 3,747,259 | A | | 7/1973 | Pellowski | |
| 3,974,592 | A | | 8/1976 | Staats | |
| 4,000,578 | A | * | 1/1977 | Souza ........................... 43/92 |
| 4,152,861 | A | | 5/1979 | Miller | |
| 4,236,341 | A | * | 12/1980 | Torkko .......................... 43/88 |
| 4,308,682 | A | * | 1/1982 | Cesar ............................ 43/88 |
| 4,499,685 | A | | 2/1985 | Sibley | |
| 4,517,762 | A | | 5/1985 | Venetz | |

* cited by examiner

Primary Examiner—Teri Pham Luu
Assistant Examiner—Bret Hayes
(74) Attorney, Agent, or Firm—Hunter E. Webb, Esq.; Hoffman, Warnick & D'Alessandro LLC

(57) ABSTRACT

A support for a trap, a combination thereof and a method of supporting a trap are disclosed. The support provides a mechanism for more stable support of a trap such that the chance of premature activation is greatly reduced, and increases trap activation speed. Since the support is not trap-size specific, it is capable of use with practically any body-gripping trap regardless of size. The support is also operational on any terrain including land, water or manmade structures, e.g., concrete bridge abutments or culvert pipes.

14 Claims, 1 Drawing Sheet

US 6,904,713 B2

SUPPORT FOR TRAP, COMBINATION THEREOF AND METHOD

This application claims benefit of U.S. Provisional Application No. 60/419,284, filed Oct. 18, 2002, under 35 U.S.C. § 119(e), and which is hereby incorporated by reference.

BACKGROUND OF THE INVENTION

1. Technical Field

The present invention relates generally to a body-gripping trap, and more particularly, to a support for a body-gripping trap.

2. Related Art

Body-gripping traps such as those referred to as Conibear® traps are widely used in the field of trapping to capture animals such as raccoon, muskrat, mink, beaver, otter, etc., along animal passages on land or in water. Body-gripping traps conventionally include at least two spring-biased jaws that close quickly to capture a part of an animal. When set, the trap jaws are biased to an open, set position in a side-by-side relationship to each other. The jaws are held in the set position by a trigger element including a pivoting wire apparatus on one jaw and a dog on the other jaw. When an animal enters into the trap, the dog is displaced by the animal's movement such that the trigger element releases, causing the trap to close rapidly to entrap the animal.

One problem with this type trap is that the trap does not inherently include structure to support the trap in the wide variety of positions encountered in the field of use. Accordingly, trappers oftentimes resort to using makeshift supports for this type trap by using such things as rocks, sticks, twigs or other matter available at the time of setting. Use of a makeshift support is an extremely undesirable situation because the unreliable nature of these supports oftentimes causes a trap to activate prematurely. Premature activation greatly reduces the chances of catching an animal and, worse, creates a dangerous situation for the trapper during setting and/or checking of traps. In addition, even if the trap does not prematurely activate, makeshift supports do not provide adequate stabilization to prevent an animal from knocking over a trap.

A number of trap holders have been proposed that include at least one vertical stake to be pushed into the ground and some mechanism to hold the trap in place such as a tether. These holders suffer a number of drawbacks. First, they require a ground surface capable of having a stake driven into it, which prevents their use in many situations where the underlying material is hard such as in concrete bridge abutments or culvert pipes. Second, many of these holders simply position the traps and do not adequately stabilize the traps from movement. Since many body-gripping traps are very sensitive to movement of any kind, even movement relative to a holder can cause premature activation and non-capture of an animal. Third, conventional trap holders are typically trap-size specific, which limits their use.

In view of the foregoing, there is a need in the art for a trap support that prevents premature activation.

SUMMARY OF THE INVENTION

The invention includes a support for a trap, a combination thereof and a method of supporting a trap. The support provides a mechanism for more stable support of a trap such that the chance of premature activation is greatly reduced, and may increase trap activation speed. Since the support is not trap-size specific, it is capable of use with practically any body-gripping trap regardless of size. The support is also operational on any terrain including land, water or manmade structures, e.g., concrete bridge abutments or culvert pipes.

A first aspect of the invention is directed to a support for a trap, the support comprising: a base; a positioning member extending from the base for positioning a first jaw of the trap; and a retractable engaging member extending from the base for engaging a second jaw of the trap.

A second aspect of the invention is directed to in combination, a trap and a trap support, the combination comprising: a body-gripping trap; and a support for the body-gripping trap including: a base; a positioning member extending from the base for engaging a first jaw of the body-gripping trap; and a retractable engaging member extending from the base for engaging a second jaw of the body-gripping trap.

A third aspect of the invention is directed to a method of supporting a trap, the method comprising the steps of: contacting a first jaw of the trap to a positioning member of a support, the support including the positioning member and a freestanding base; and engaging a second jaw of the trap with a retractable member of the support to support the trap.

A fourth aspect of the invention is directed to a support for use with a body-gripping trap, the support comprising: a freestanding base; means for positioning the trap relative to the base; and means for holding the trap to the base.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

Figure 1:
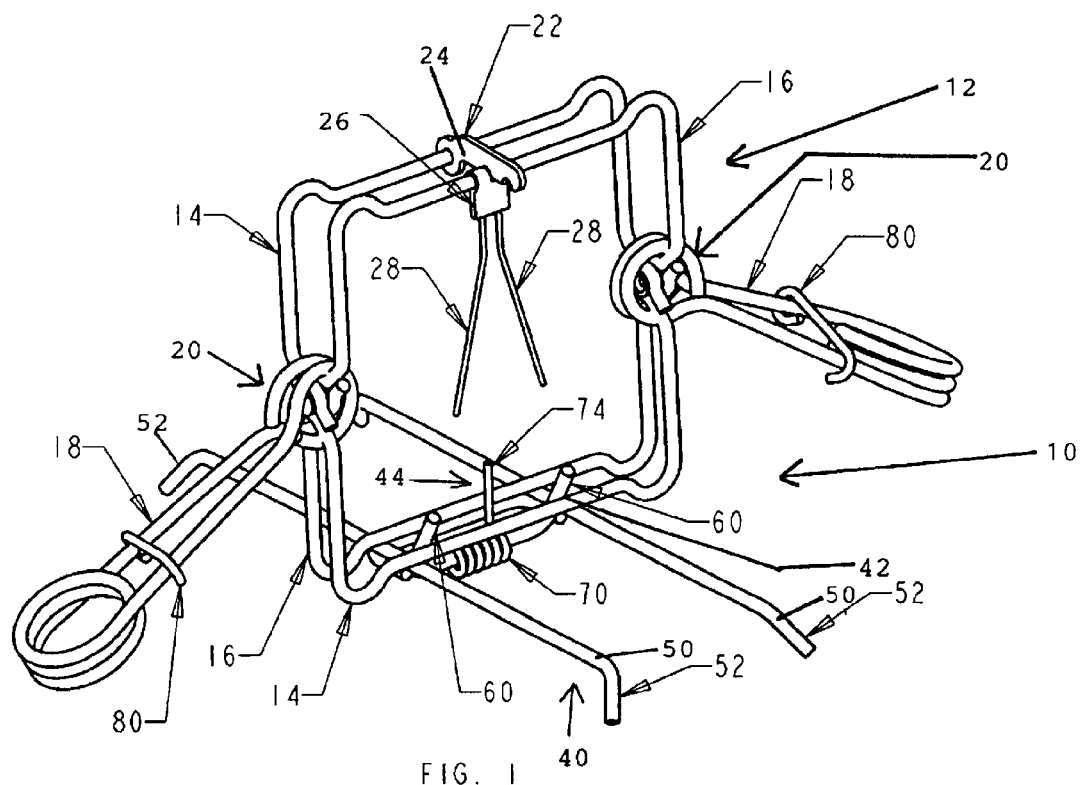
FIG. 1 shows a trap and support combination according to the invention.

With reference to the accompanying drawings, FIG. 1 is a perspective view of a support 10 for a body-gripping trap 12. Body-gripping trap 12 may be any now known or later developed trap having at least a first jaw 14 and a second jaw 16 that are biased from a set position (as shown) to a closed position by at least one trap biasing member 18, e.g., a coil or leaf spring. By "jaw" is meant any body-gripping member of a trap. First jaw 14 and second jaw 16 are pivotable about a pivot point 20. A trigger 22 holds first and second jaws 14, 16 in a set position until released by an animal (not shown). Trigger 22 may include any now known or later developed mechanism for holding the jaws in the closed position until activated. In the embodiment shown, trigger 22 includes a pivoting member 24, e.g., wire, on first jaw 14 that engages a dog 26 on second jaw 16 to hold jaws 14, 16 in the set position, and at least one finger 28 extending into the intended path of the animal. When finger 28 is engaged by the animal, pivoting member 24 pivots away from dog 26 to allow quick closing of jaws 14, 16 under the bias of biasing member(s) 18.

Figure 2:
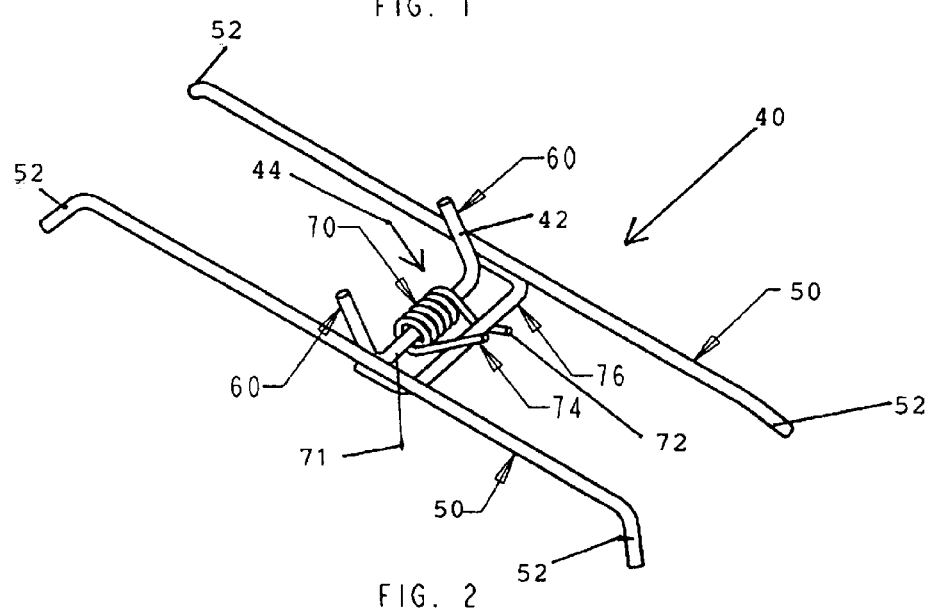
FIG. 2 shows details of the support of FIG. 1.

Referring now to FIGS. 1 and 2, support 10 includes a base 40; a positioning member 42 extending from base 40 for engaging first jaw 14 of trap 12; and a retractable engaging member 44 extending from base 40 for engaging second jaw 16 of trap 10. Trap 12 extends in a substantially perpendicular fashion to base 40 when supported thereby. Base 40 is preferably provided as a free-standing structure, i.e., it is independent of any supporting unit or background. In one embodiment, base 40 includes a plurality of legs 50. In the illustrative embodiment, two legs 50 are provided, each with a curved end 52 for engaging a support surface. It should be recognized, however, that any number of legs that provide sufficient support for the intended field of use may be provided. In addition, it should be recognized that base 40 may be provided by a variety of other structures capable of allowing the base to be freestanding, e.g., as a plate or other solid member. Base 40, while allowing for freestanding use, may also be anchored as required by a user. For example, it may be advantageous to couple support 10 to a substantially vertical structure such that trap 12 extends in a horizontal fashion.

Positioning member 42 extends from base 40 for positioning first jaw 14 of trap 12. In one embodiment, positioning member 42 includes a plurality of trap contacting legs 60 extending from base 40. Legs 60 may extend from base 40 at an angle, e.g., of approximately 60° relative to base 40, such that a jaw 14, 16 may slide into engagement with legs 60. In one embodiment, legs 60 may be provided as part of a wire including 90° bends at each end to form ears or tabs, and a transversely extending connector 71 for ease of construction and strengthening of base 40. Positioning member 42, however, may be provided in any form that can position and hold the position a jaw 14, 16 relative to the base, e.g., as a plate, plate members, a block, etc.

Retractable engaging member 44 extends from base 40 for engaging a second jaw 16 of trap 12 and holding trap 12 to support 10. Retractable engaging member 44 is movable between a first trap engaging position (as shown) that allows support of trap 12, and a second retracted position in which it is out of engagement with a respective jaw 14, 16 and allows set up of trap 12 and support 40 and setting of trap 12, as will be described below. In one embodiment, retractable engaging member 44 includes a coil spring 70 coupled to base 40, for example, by placement about transversely extending connector 71 of positioning member 42. Coil spring 70 includes a first leg 72 engaging a first side of a detent 76 on base 40 and a second leg 74 that engages a second side of detent 76 when not in operation (FIG. 2). In operation, second leg 74 engages trap 12, i.e., second jaw 16 (FIG. 1). First leg 72 may be shorter than second leg 74 to conserve on material, but this is not necessary. Detent 76 may be any structure capable of preventing rotational movement of coil spring 70 and operation to engage second jaw 16 by second leg 74. In the illustrative embodiment shown, detent 76 also provides strength to base 40. Coil spring 70 is structured to maintain first jaw 14 engagement with positioning member 42 and hold second jaw 16 against base 40 such that trap 12 is supported in a stable fashion in a set position. Advantageously, since retractable engaging member 44 is providing additional bias to jaws 14, 16 towards a closed position, it also may increase trap 12 activation speed. Retractable engaging member 44 may also be provided by any other structure capable of retractable engagement of second jaw 16. For example, retractable engaging member 44 may be provided as a sliding, biased member or as a leaf spring, a compression spring or a torsion spring.

Referring to FIG. 1, in operation, trap 12 is supported by support 10 by contacting a first jaw 14 of trap 12 to positioning member 42, and then engaging second jaw 16 of trap 12 with retractable engaging member 44 to support the trap. A user may also set trap 12 by moving jaws 14, 16 to the set position (FIG. 1) against the bias of trap biasing member(s) 18, and setting trigger 22 to hold first and second jaw 14, 16 in the set position. In one preferred embodiment, trap 12 is set and held in the set position by safety(ies) 80 (FIG. 1) of trap biasing member(s) 18, and then positioned and engaged by support 12. Alternatively, a user may simultaneously act to position and engage trap 12 with support 10 and then set the trap. In this case, while moving first and second jaw 14, 16 to the set position, a user simultaneously moves first jaw 14 into contact with positioning member 42 and second jaw 16 into engagement with retractable engaging member 44. Once engaged, trigger 22 is set. When an animal's engagement with finger(s) 28 releases trigger 22, jaws 14, 16 pivot rapidly about pivot point 20. As first jaw 14 moves, it freely pulls away from positioning member 42. Likewise, second jaw 16 freely pulls way from retractable engaging member 44, and may be propelled slightly quicker by the recoil of member 44.

Support 10 provides a mechanism for more stable support of trap 12 such that the chance of premature activation is greatly reduced. Since support 10 is not trap-size specific, it is capable of use with practically any body-gripping trap regardless of size. Support 10 is also operational on any terrain including land, water or manmade structures, e.g., concrete bridge abutments or culvert pipes. While support 10 is shown supporting trap 12 in a vertical fashion, support 10 may also be placed at practically any angle and fastened as required. For example, support 10 may be coupled to a vertical structure such as a tree and support trap 12 in a horizontal fashion.

While the invention has been described relative to a particular type body-gripping trap 12 with a specific first jaw 14 and second jaw 16, it should be recognized that support 10 is applicable to any body-gripping trap 12 and that trap 12 may be reversed relative to support 10. That is, either jaw 14, 16 may be positioned in contact with positioning member 42 and, and an opposite jaw 14, 16 may be engaged by retractable engaging member 44. Support 10 may be formed of any material having the requisite strength for operation, e.g., steel, hard plastic, welded steel wire (as shown), etc.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A support for a trap, the support comprising:
   a base;
   a positioning member extending from the base for positioning a first jaw of the trap; and
   a retractable engaging member extending from the base for engaging a second jaw of the trap without hindering movement of the second jaw to a closed position,
   wherein the retractable engaging member is movable between a first trap engaging position and a second retracted position, and
   wherein the retractable engaging member includes a coil spring coupled to the base and having a first leg engaging a detent on the base and a second leg for engaging the trap.

2. The support of claim 1, wherein the base includes a plurality of legs.

3. The support of claim 1, wherein the base is freestanding.

4. The support of claim 1, wherein the positioning member includes a plurality of trap contacting legs extending from the base.

5. The support of claim 4, wherein each trap contacting leg extends from the base at an angle.

6. The support of claim 1, wherein the first jaw and the second jaw are biased to close by a biasing member, and the trap further includes a trigger for releasing each jaw to close upon activation.

7. In combination, a trap and a trap support, the combination comprising:

a body-gripping trap including a trigger for releasing at least two jaws to close upon activation; and a support for the body-gripping trap including:

a base;

a positioning member extending from the base for engaging one of the jaw of the body-gripping trap; and a retractable engaging member extending from the base for engaging the other jaw of the body-gripping trap, wherein the retractable engaging member is movable between a first trap engaging position and a second retracted position, and wherein the retractable engaging member includes a coil spring having a first leg engaging a detent of the trap and a second leg for engaging the trap.

8. The combination of claim 7, wherein the base includes a plurality of legs adapted to allow the base to be freestanding.

9. The combination of claim 7, wherein the body-gripping trap extends substantially perpendicular from the base in a set state.

10. The combination of claim 7, wherein the positioning member includes a plurality of trap contacting legs extending from the base.

11. The combination of claim 10, wherein each trap contacting leg extends from the base at an angle.

12. The combination of claim 7, wherein the body-gripping trap includes:

a biasing member to bias each jaw to close.

13. A method of supporting a trap, the method comprising the steps of:

contacting a first jaw of the trap to a positioning member of a support, the support including the positioning member and a freestanding base;

engaging a second jaw of the trap with a retractable member of the support to support the trap; and setting the trap by setting a trigger that holds the first and second jaw in a set position against a bias of a trap biasing member, wherein the retractable engaging member includes a coil spring, and the engaging step includes contacting the second jaw with a leg of the coil spring.

14. The method of claim 13, wherein the setting step occurs after the engaging step.

\* \* \* \* \*

UNITED STATES PATENT AND TRADEMARK OFFICE
CERTIFICATE OF CORRECTION

PATENT NO. : 6,904,713 B2
DATED : June 14, 2005
INVENTOR(S) : Beauregard

It is certified that error appears in the above-identified patent and that said Letters Patent is hereby corrected as shown below:

Column 5,
Line 19, please insert -- s -- after the word "jaw".

Column 6,
Line 25, please delete the word "engaging".

Signed and Sealed this

Thirtieth Day of August, 2005

JON W. DUDAS
*Director of the United States Patent and Trademark Office*